(12) United States Patent
Hexsel et al.

(10) Patent No.: US 12,298,402 B2
(45) Date of Patent: May 13, 2025

(54) TECHNIQUES FOR POINT CLOUD FRAME ACCUMULATION IN FMCW LIDAR

(71) Applicant: AEVA, INC., Mountain View, CA (US)

(72) Inventors: Bruno Hexsel, Mountain View, CA (US); Heethesh Vhavle Naresh, Sunnyvale, CA (US); Kumar Bhargav Viswanatha, Santa Clara, CA (US); Mina Rezk, Haymarket, VA (US); James Reuther, San Francisco, CA (US)

(73) Assignee: Aeva, Inc., Mountain View, CA (US)

( * ) Notice: Subject to any disclaimer, the term of this patent is extended or adjusted under 35 U.S.C. 154(b) by 221 days.

(21) Appl. No.: 18/064,761

(22) Filed: Dec. 12, 2022

(65) Prior Publication Data

US 2023/0213655 A1 Jul. 6, 2023

Related U.S. Application Data

(60) Provisional application No. 63/295,797, filed on Dec. 31, 2021.

(51) Int. Cl.
*G01S 17/89* (2020.01)
*G01S 7/491* (2020.01)
*G01S 17/58* (2006.01)

(52) U.S. Cl.
CPC .......... *G01S 17/89* (2013.01); *G01S 7/491* (2013.01); *G01S 17/58* (2013.01)

(58) Field of Classification Search
CPC ........ G01S 17/08; G01S 17/491; G01S 17/58; G01S 7/4808; G01S 7/493; G01S 17/34; G01S 17/42; G01C 21/1652
See application file for complete search history.

(56) References Cited

U.S. PATENT DOCUMENTS

2018/0176551 A1 6/2018 Viswanathan et al.
2019/0317219 A1 10/2019 Smith et al.
(Continued)

FOREIGN PATENT DOCUMENTS

CN 116012540 A * 4/2023 ............ G01S 17/50

OTHER PUBLICATIONS

International Search Report and Written Opinion dated Mar. 28, 2023 from International Application No. PCT/US2022/053841 filed Dec. 22, 2022; 13 pages total.

*Primary Examiner* — Hina F Ayub
*Assistant Examiner* — Carlos Perez-Guzman
(74) *Attorney, Agent, or Firm* — Womble Bond Dickinson (US) LLP (57) ABSTRACT

A method generates first points based on a first scan of an environment that includes one or more moving objects. The method transforms the first points into a first static frame, which includes removing one or more of the first points corresponding to the one or more moving objects. The method generates second points based on a second scan of the environment that includes the one or more moving objects. The method transforms the second points into a second static frame, which includes removing one or more of the second points corresponding to the one or more moving objects. The method combines the first static frame and the second static frame into an accumulated static frame, which has an increase in resolution compared with the first static frame. The method then loads the accumulated static frame into a point cloud.

20 Claims, 7 Drawing Sheets

(56) References Cited

U.S. PATENT DOCUMENTS

| | | | |
|---|---|---|---|
| 2020/0292706 A1* | 9/2020 | Hexsel | G01S 17/89 |
| 2021/0356601 A1 | 11/2021 | Burbank et al. | |
| 2023/0131715 A1* | 4/2023 | Chen | G01S 17/50 702/159 |

* cited by examiner

TECHNIQUES FOR POINT CLOUD FRAME ACCUMULATION IN FMCW LIDAR

CROSS-REFERENCE TO RELATED APPLICATIONS

This application claims priority from and the benefit of U.S. Provisional Patent Application No. 63/295,797 filed Dec. 31, 2021, the entire contents of which are incorporated herein by reference.

FIELD OF INVENTION

The present disclosure is related to frame accumulation, and more particularly to point cloud frame accumulation in a frequency-modulated continuous wave (FMCW) light detection and ranging (LIDAR) system.

BACKGROUND

Frequency-Modulated Continuous Wave (FMCW) LIDAR systems provide precise and reliable range, direction, and reflectance measurements that can be used for obstacle avoidance or measuring characteristics such as dimensions and reflectivity of objects in a scene within the sensor's field-of-view (FoV). However, the readings of FMCW approaches have lower resolutions compared to readings from imaging sensors, such as cameras. This presents difficulty in FMCW LIDAR systems detecting small objects or and/or features at far distances.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One aspect disclosed herein is directed to a method of point cloud frame accumulation in a frequency-modulated continuous wave (FMCW) light detection and ranging (LIDAR) system. As discussed herein, an FMCW LIDAR system may also be referred to as a LIDAR system.

According to some embodiments, the method generates points based on scanning an environment that includes moving objects. The method transforms the points into a static frame by removing dynamic points corresponding to the moving objects from the generated points, The method generates other points based on another scan of the environment that includes the moving objects, and transforms the other points into another static frame by removing the dynamic points corresponding to the moving objects from the other points. The method combines the two static frames into an accumulated static frame, which has an increase in resolution compared with the individual static frames. The method then loads the accumulated static frame into a point cloud to increase the resolution of the point cloud.

According to some embodiments, the FMCW LIDAR system includes a sensor. To further transform the points, the method computes a sensor twist of the sensor associated with the scan. The sensor twist includes a linear velocity and an angular velocity of the sensor. The method retrieves a Doppler velocity of each of the points and compares the Doppler velocity of each one of the points with the sensor twist of the sensor to produce a comparison. The method determines which of the points correspond to the moving objects (e.g., dynamic points) based on the comparison.

According to some embodiments, the static frame includes scan lines and another static frame includes other scan lines that are interlaced between the scan lines based on the sensor twist.

According to some embodiments, to further transform the points and the other points, the method stores the static frame with a sensor pose into an accumulator. The sensor pose indicates a position and an orientation of the sensor at a point in time associated with the scan. The method stores the other static frame with another sensor pose into the accumulator. The other sensor pose indicates another position and another orientation of the sensor at a point in time associated with the other scan. The method then combines the static frame with the other static frame based on a difference between the sensor pose and the other sensor pose.

According to some embodiments, the method generates additional points based on an additional scan of the environment that includes the moving objects. The additional scan is subsequent to the other scans and the additional points include static points and dynamic points. The method then loads the additional points, which includes both the static points and the dynamic points, into the point cloud with the accumulated static frame.

According to some embodiments, the method receives returned optical beams in response to transmitting optical beams that are spaced non-uniformly based on a scan pattern. The method then generates the points from the returned optical beams. The method receives other returned optical beams in response to transmitting other optical beams that are spaced non-uniformly based on another scan pattern. The method then generates the other points from the other returned optical beams.

According to some embodiments, the method positions sensors at a position to generate the scan pattern, and adjusts the sensors to another position to generate the other scan pattern.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE DRAWINGS

For a more complete understanding of the various examples, reference is now made to the following detailed description taken in connection with the accompanying drawings in which like identifiers correspond to like elements.

DETAILED DESCRIPTION

According to some embodiments, the described LIDAR system may be implemented in any sensing market, such as, but not limited to, transportation, manufacturing, metrology, medical, and security systems. According to some embodiments, the described LIDAR system is implemented as part of a front-end of frequency modulated continuous-wave (FMCW) device that assists with spatial awareness for automated driver assist systems, or self-driving vehicles.

LIDAR sensors provide precise and reliable range, direction and reflectance measurements that can be used for obstacle avoidance or measuring characteristics, such as determining dimensions and reflectivity of objects in a scene within the sensor's field-of-view (FoV). LIDAR sensors transmit optical beams in the FoV that are spaced at "vertical angles," which creates a vertical spacing between the beams when they contact targets (also referred to herein as "angular resolution"). As such, returned optical beams reflected from the target, when processed, produce scan lines that also have the angular resolution characteristics.

A shortcoming of LIDAR sensors is that the returned optical beam angular resolution characteristics produce sparse readings in a point cloud compared with imaging sensor readings (e.g., cameras) because the image sensor readings usually have one or more orders of magnitude more information points per sampled frame. This presents a problem for LiDAR sensors when attempting to capture small objects or small features in a scene (e.g., lane markers at a distance).

Accordingly, the present disclosure addresses the above-noted and other deficiencies by disclosing systems and methods for using vehicle motion and small angular perturbations (e.g., dithering) to produce scan frames that fill in gaps between scan lines of previous scan frames. To eliminate ghosting effects, the present disclosure removes "dynamic points" (points corresponding to moving objects) from each of the scan frames to produce static frames. The present disclosure then accumulates the static frames and loads the accumulated static frame into the point cloud, which increases the resolution of the point cloud and enables the LIDAR system to better detect small objects and small features in a scene.

Figure 1:
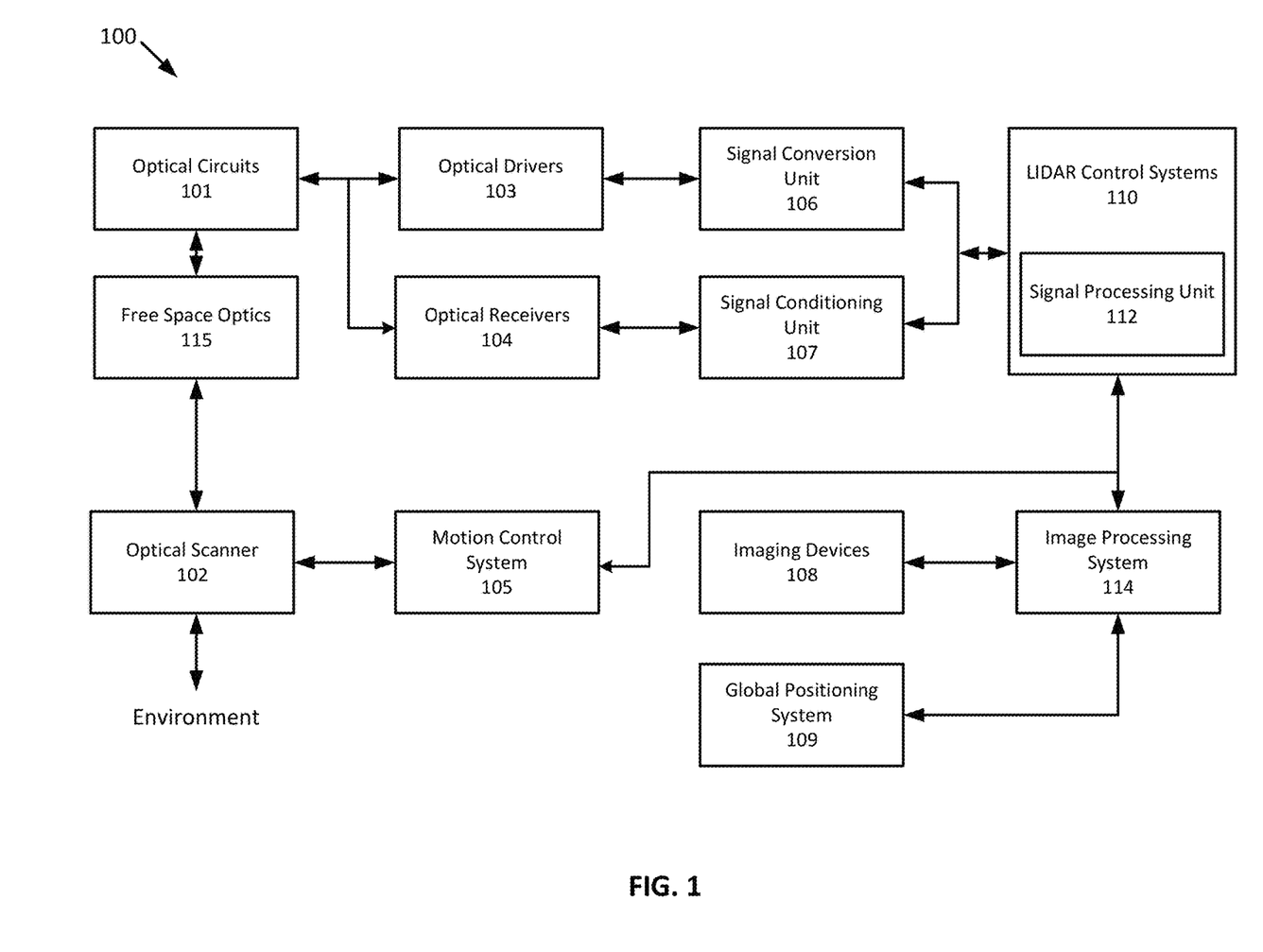
FIG. 1 illustrates an example LIDAR system, according to some embodiments of the present disclosure.

FIG. 1 illustrates an example LIDAR system, according to some embodiments of the present disclosure. The LIDAR system 100 includes one or more of each of a number of components, but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some embodiments, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some embodiments, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some embodiments, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like. In some embodiments, optical scanner 102 includes a rangefinder sensor 310 (shown in FIG. 3) is controlled by a dithering scan pattern generator (dithering scan pattern generator 305 in FIG. 3) to adjust the transmission of optical beams based on scan patterns to eventually increase the resolution of a point cloud as discussed herein. In some embodiments, dithering scan pattern generator 305 is code executed by signal processing unit 112 discussed below.

To control and support the optical circuits 101 and optical scanner 102, the LIDAR system 100 includes LIDAR control systems 110. The LIDAR control systems 110 may include a processor or processing device for the LIDAR system 100. In some embodiments, the processor or processing device may be one or more general-purpose processing devices such as a microprocessor, central processing unit, or the like. More particularly, the processor or processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some embodiments, the LIDAR control systems 110 may include a processor or processing device that may be implemented with a DSP, such as signal processing unit 112. The LIDAR control systems 110 are configured to output digital control signals to control optical drivers 103. In some embodiments, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some embodiments, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some embodiments, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some embodiments, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some embodiments, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some embodiments, the LIDAR system 100 is configured to use nondegenerate optical sources to simultaneously measure range and velocity across two dimensions. This capability allows for real-time, long range measurements of range, velocity, azimuth, and elevation of the surrounding environment.

In some embodiments, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some embodiments, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 3:
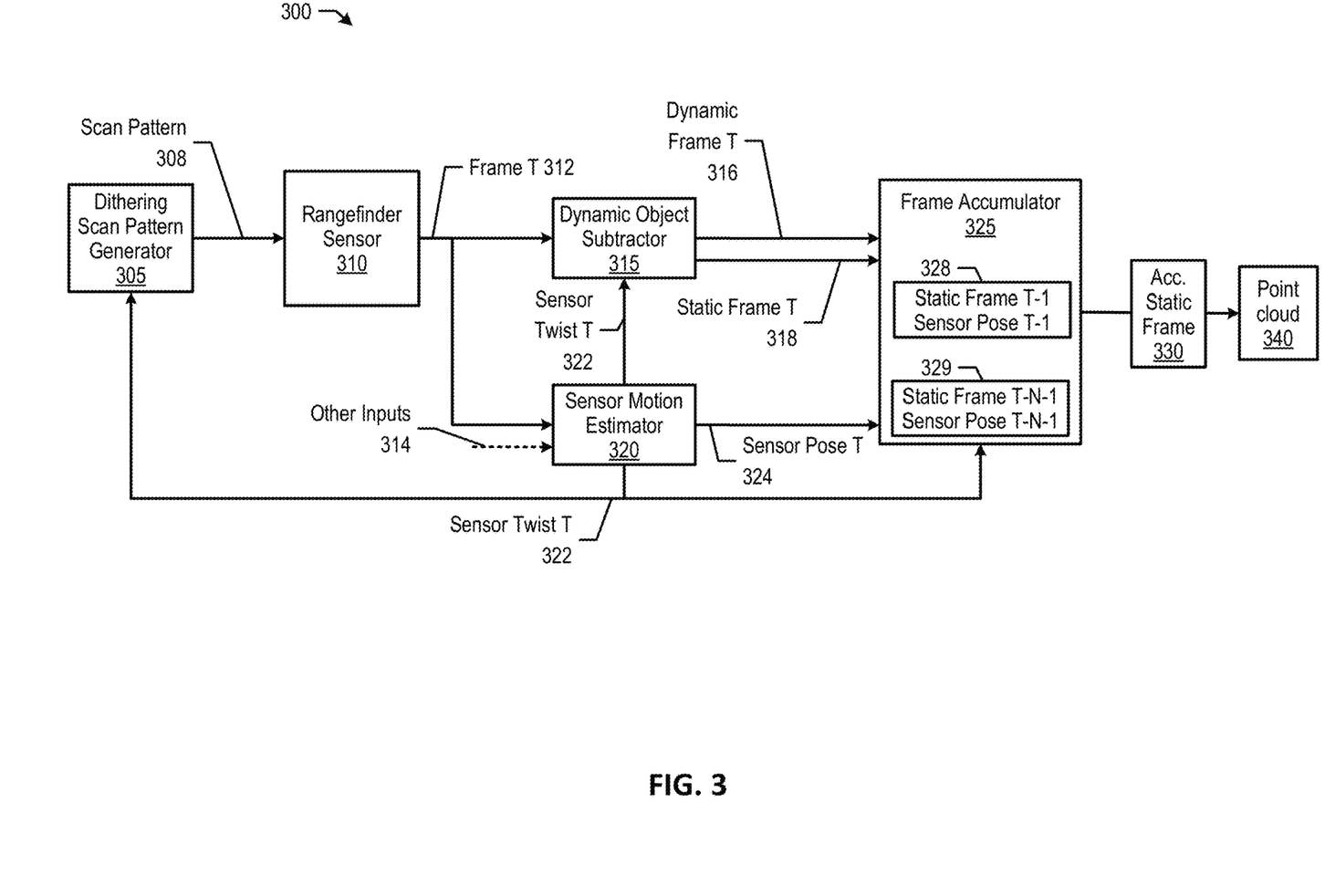
FIG. 3 illustrates an FMCW point cloud frame accumulator (PCFA) system, according to some embodiments of the present disclosure.

In some embodiments, signal processing unit 112 executes functional blocks shown in FIG. 3, such as dithering scan pattern generator 305, dynamic object subtractor 315, sensor motion estimator 320, and frame accumulator 325. In some embodiments, signal processing unit 112 generates points based on scans of an environment by optical scanner 102. Signal processing unit 112 then transforms the points into static frames by removing some of the points that correspond to moving objects (e.g., dynamic points) in the environment. Signal processing unit 112 then combines the static frames into an accumulated static frame and loads the accumulated static frame into the 3D point cloud (see FIGS. 3-7 and corresponding text for further details).

Figure 2:
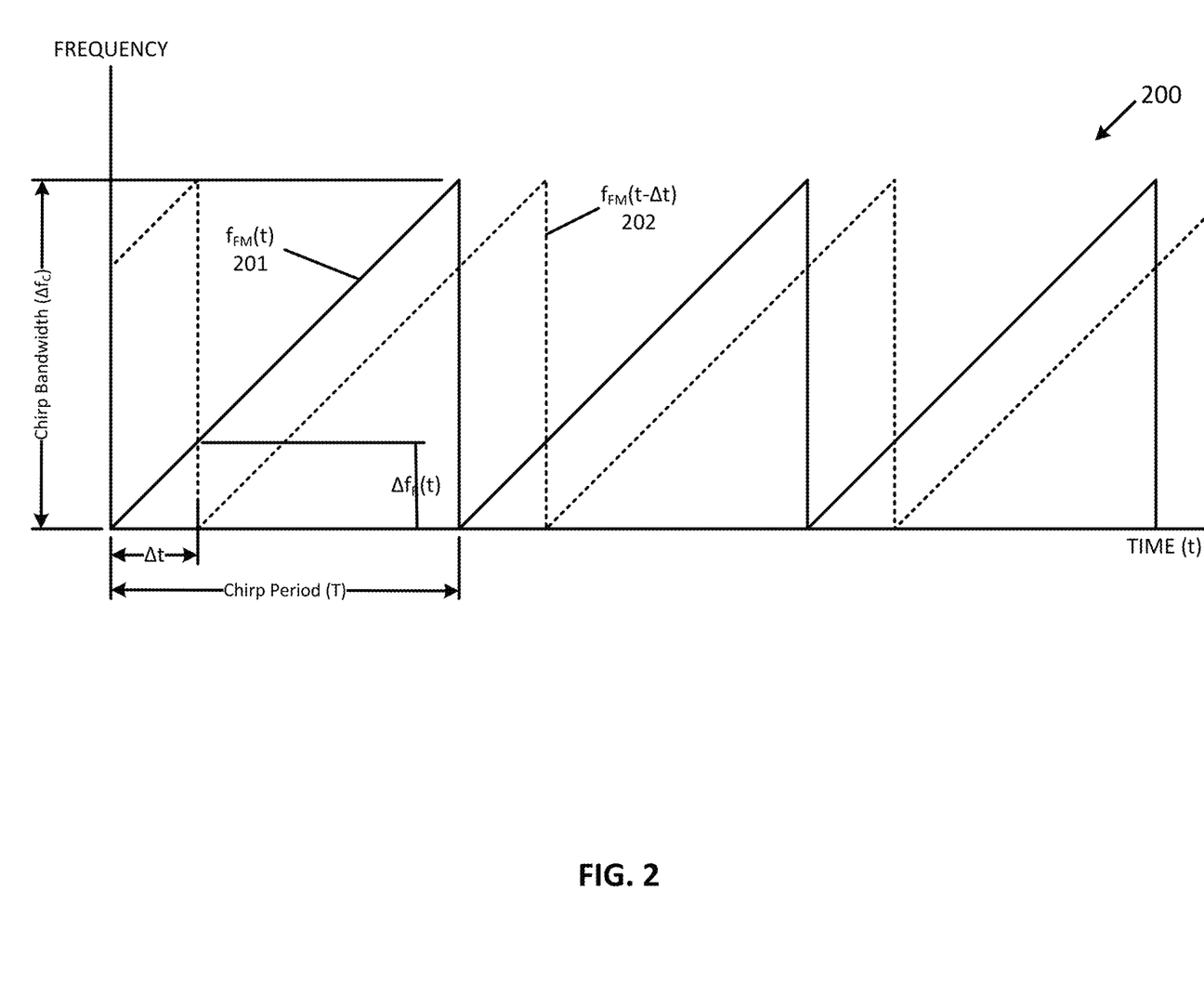
FIG. 2 is a time-frequency diagram illustrating how LIDAR waveforms are detected and processed, according to some embodiments of the present disclosure.

FIG. 2 is a time-frequency diagram illustrating how LIDAR waveforms are detected and processed, according to some embodiments of the present disclosure. In one example, the scanning waveform 201, labeled as $f_{FM}(t)$, is a sawtooth waveform (sawtooth "chirp") with a chirp bandwidth $\Delta fC$ and a chirp period TC. The slope of the sawtooth is given as $k=(\Delta fC/TC)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta fR(t)$ is generated. The beat frequency $\Delta fR(t)$ is linearly related to the time delay $\Delta t$ by the slope of the sawtooth k. That is, $\Delta fR(t)=k\Delta t$. Since the target range R is proportional to $\Delta t$, the target range R can be calculated as $R=(c/2)(\Delta fR(t)/k)$. That is, the range R is linearly related to the beat frequency $\Delta fR(t)$. The beat frequency $\Delta fR(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta fRmax$) is 500 megahertz. This limit in turn determines the maximum range of the system as $Rmax=(c/2)(\Delta fRmax/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

FIG. 3 illustrates an FMCW point cloud frame accumulator (PCFA) system, according to some embodiments of the present disclosure. In some embodiments, FMCW PCFA system 300, also referred to herein as PCFA system 300, includes hardware (e.g., rangefinder sensor 310) that resides in optical scanner 102 shown in FIG. 1, and software (dithering scan pattern generator 305, dynamic object subtractor 315, sensor motion estimator 320, frame accumulator 325, and point cloud 340) that is executed by signal processing unit 112 shown in FIG. 1.

As discussed in detail below, PCFA system 300 removes dynamic points from scan frames to produce static frames, and combines the static frames into a higher resolution accumulated static frame to increase the resolution of a point cloud. For example, a static frame is a collection of points that correspond to stationary objects in an environment and does not include points corresponding to moving objects in the environment. In some embodiments, each point detected in a frame is determined to be static or dynamic by comparing the Doppler velocity for each point with the expected projected ground velocity of PCFA system 300 (e.g., LIDAR system 100 coupled to an autonomous driving vehicle (ADV)). For example, if PCFA system 300 is traveling at 40 mph, then any point traveling at −40 mph (or within a range) relative to PCFA system 300 is considered static. When a point is determined to be static (stationary), it is used for frame accumulation. Points that are determined to be dynamic are not accumulated since doing so causes past images of those points to be part of the scene (e.g., ghosting effect). For example, if the sensor is stopped and a vehicle is moving in front of the PCFA system 300, PCFA system 300 would duplicate accumulated points over time as the same vehicle would be measured at different ranges. Thus, the dynamic points are removed for the purpose of static frame accumulation.

PCFA system 300 includes dithering scan pattern generator 305, which generates and feeds scan pattern 308 into rangefinder sensor 310. Rangefinder sensor 310 scans an environment using scan pattern 308 and produces scan frame T 312 (T is a point in time). Rangefinder sensor 310, in some embodiments, is a sensor in optical scanner 102 shown in FIG. 1. Rangefinder sensor 310 produces scan frames T 312 at particular points in time, such as frame T 312 at time t. Rangefinder sensor 310 provides frame T 312 to dynamic object subtractor 315 and sensor motion estimator 320.

Sensor motion estimator 320 estimates a sensor pose T 324 and a sensor twist T 322 for each frame T 312. Sensor pose T 324 consists of a 6-DOF (degrees of freedom) position and orientation of rangefinder sensor 310 at time T, and sensor twist T 322 consists of a linear velocity and an angular velocity of rangefinder sensor 310 at time T. In some embodiments, sensor motion estimator 320 uses other inputs 314 (e.g., GPS data, etc.) to produce estimations. In some embodiments, the sensor motion estimates may be provided by a sensor motion estimator external to the LIDAR system 100.

Sensor twist T 322 feeds into dynamic object subtractor 315, dithering scan pattern generator 305, and frame accumulator 325. Dynamic object subtractor 315 uses sensor twist T 322 to distinguish between dynamic points and static points in a frame T based on each point's velocity in the frame (determined by rangefinder sensor 310) relative to sensor twist T 322. For example, if the rangefinder sensor is traveling at 10 mph, then any object (points) traveling at −10 mph relative to rangefinder sensor 310 in frame T is static (not moving). In some embodiments, dynamic object subtractor 315 uses a velocity range (e.g., +/−1 mph) to determine whether objects (points) are static or dynamic. Dynamic object subtractor 315 removes dynamic points from frame T 312 to produce static frame T 318. Dynamic object subtractor 315 also produces dynamic frame T 316, which includes both dynamic points and static points. The most recent dynamic frame T 316 is also added to point cloud 340 to provide a complete representation of the environment.

Dithering scan pattern generator 305 uses sensor twist T 322 to adjust (dither) scan pattern 308 as discussed herein to increase the resolution of static points by moving the scan pattern 308 to cover gaps in between previous scan lines. In some embodiments, the change in the scan pattern may also be a function of the current velocity of PCFA system 300 (see FIGS. 4A-6C and corresponding text for further details).

Frame accumulator 325 uses sensor twist T 322 to combine the N static frames 328, 329 (where N is the number of desired accumulated frames) based on their corresponding sensor poses relative to sensor twist T 322. In some embodiments, frame accumulator 325 includes logic to remove noisy static outlier points and fuse static points based on neighborhood or measurement similarity/compatibility in an accumulated static map frame. In turn, frame accumulator 325 generates an accumulated static frame 330 and loads the accumulated static frame into point cloud 340. In some embodiments, frame accumulator 325 also passes dynamic points from the most recent frame to point cloud 340.

FIGS. 4A-4D are diagrams illustrating an FMCW point cloud frame accumulator (PCFA) system accumulating static frames as the accumulator moves towards an object, according to some embodiments of the present disclosure.

Figure 4A:
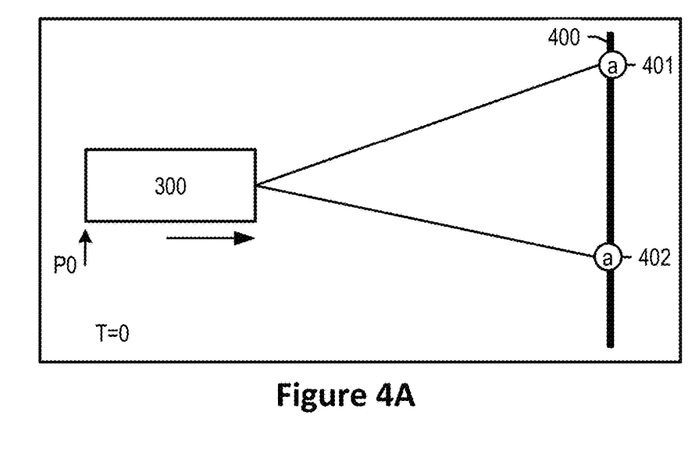
FIGS. 4A-4D are diagrams illustrating an FMCW point cloud frame accumulator (PCFA) system accumulating static frames as the accumulator moves towards an object, according to some embodiments of the present disclosure.

FIGS. 4A-4D depict positions of PCFA system 300 at points in time that PCFA system 300 travels towards object 400 (e.g., a wall). FIG. 4A shows PCFA system 300 at position P0 (e.g., time=0). PCFA system 300 scans the environment using two scan lines and captures two 'a' points 401 and 402. Since this is the first frame detected, only the two 'a' points 401 and 402 are accumulated.

Figure 4B:
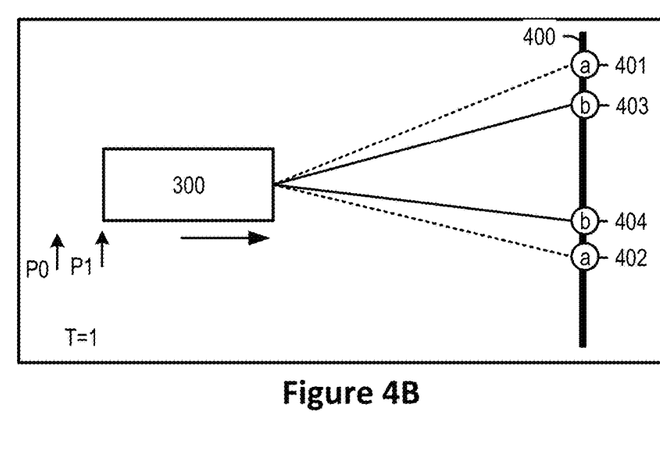

FIG. 4B shows PCFA system 300 at position P1 (e.g., time=1). PCFA system 300 scans the environment using two scan lines and captures two 'b' points 403 and 404, which are at different locations from points 401 and 402 due to the difference in distance between PCFA system 300 and object 400. For example, as PCFA system 300 moves towards object 400, the spacing between where the scan lines contact object 400 naturally decreases. At this point, the first frame and second frame have been accumulated and therefore a total of four points 401, 402, 403, and 404 have been accumulated.

Figure 4C:
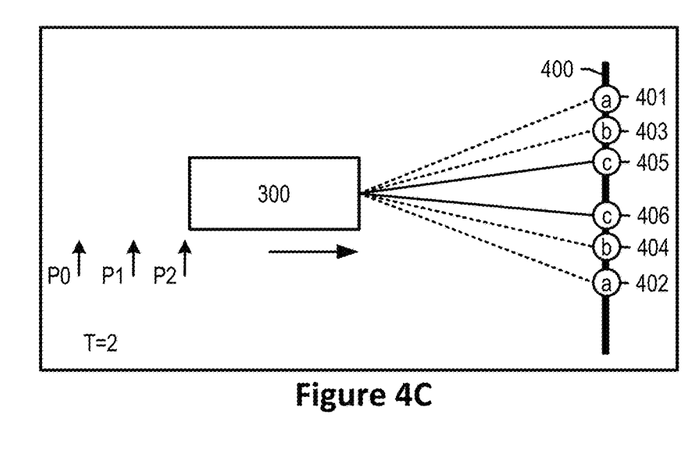

FIG. 4C shows PCFA system 300 at position P2 (e.g., time=2). PCFA system 300 scans the environment using two scan lines and captures two 'c' points 405 and 406. At this point, the first frame, second frame, and third frame have been accumulated and therefore a total of six points 401-406 have been accumulated. Accordingly, the accumulated resolution in FIG. 4C is greater than the resolution in FIG. 4A due to the accumulation of six detection points from three frames rather than just two points from a single frame. For example, lane lines can be seen on a road as well as a small object in the distance that may otherwise would not have been detected by the PCFA system 300 without static frame accumulation.

Figure 4D:
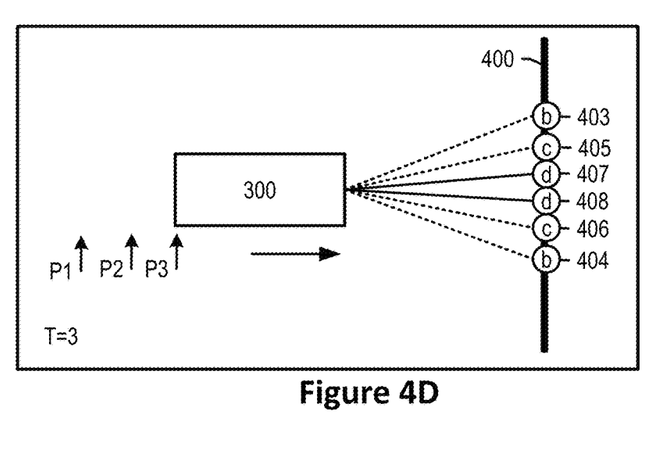

FIG. 4D shows PCFA system 300 at position P3 (e.g., time=3). PCFA system 300 scans the environment using two scan lines and captures two 'd' points 407 and 408. In some embodiments, PCFA system 300 uses a limited size accumulator to manage the amount of resources required. The example shown in FIG. 4D shows that the accumulator saves three static frames (N=3). As such, PCFA system 300 removes older points 'a' 401 and 402 from the accumulation and keeps the most recent points 403-408 to maintain the higher resolution. In some embodiments, the number of accumulated frames may be adjusted to provide increased scene resolution while factoring in computer resources necessary to store and process additional accumulated frames.

In some embodiments, moving objects (e.g., vehicles) are depicted in the point cloud without ghosting issues because PCFA system 300 removes the dynamic points from the scan frames prior to combining the scan frames and uses the most recent dynamic frame T 316 to provide moving object information. In some embodiments, to generate the higher scene resolution using frame accumulation, PCFA system 300 may transform the previously collected frames to the current frame. For example, the system may perform a transformation for each frame from the coordinate system, frame of reference, or position at which the frame was obtained to the current position or coordinate system at collection of the current or most recent frame. Thus, each of the accumulated frames may be translated to appear as though they were collected at the current position, thus increasing the resolution of the scene.

Figure 5A:
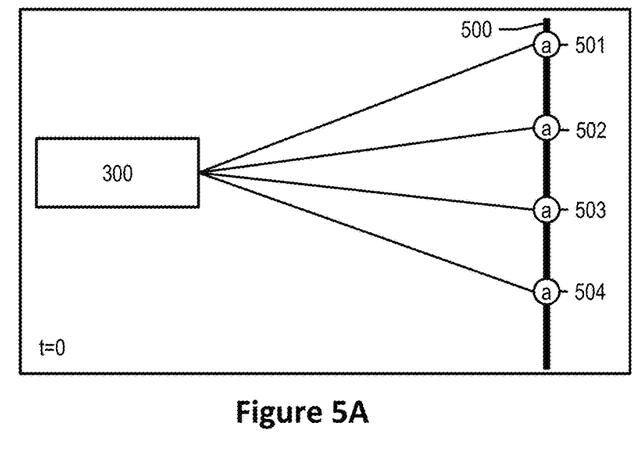
FIGS. 5A-5C are diagrams illustrating an FMCW point cloud frame accumulator (PCFA) system that accumulates static frames by dithering a uniform scan pattern, according to some embodiments of the present disclosure.
Figure 5B:
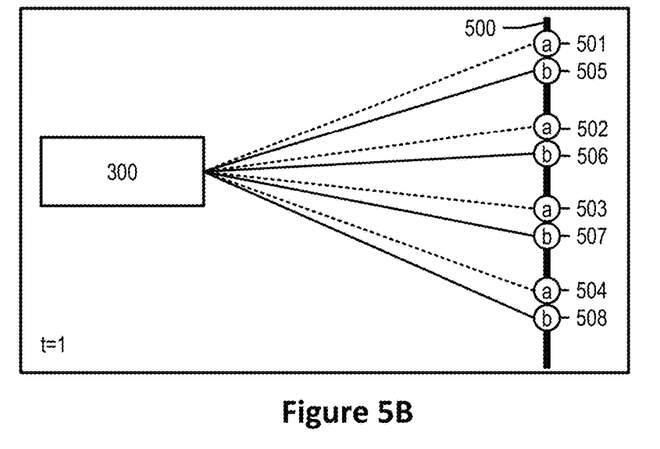
Figure 5C:
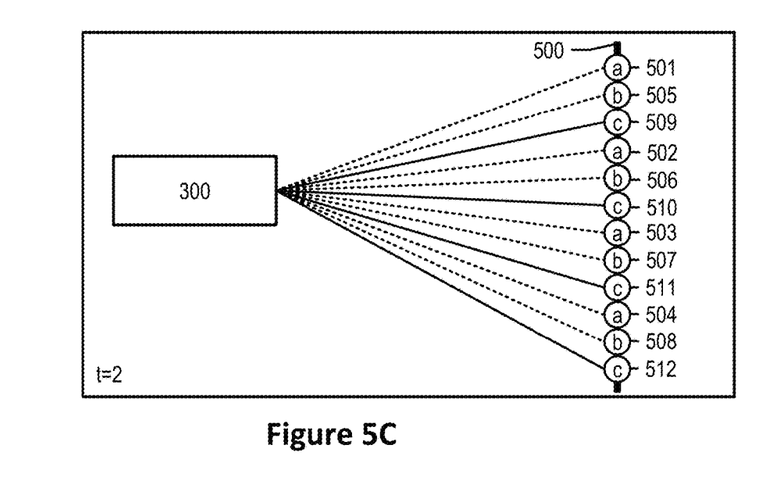
Figure 6A:
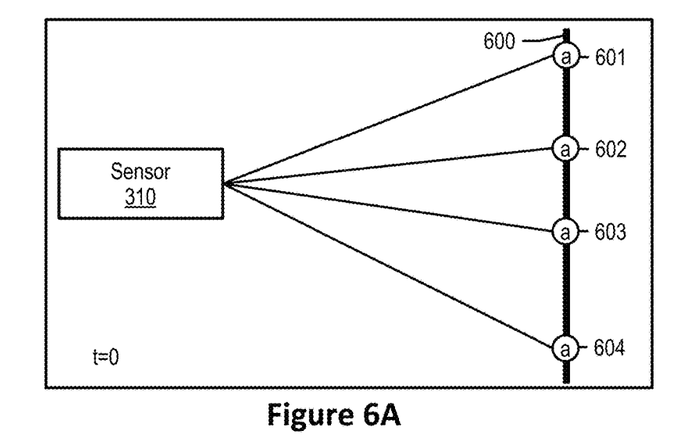
FIGS. 6A-6C are diagrams illustrating an FMCW point cloud frame accumulator (PCFA) system accumulating static frames by dithering a non-uniform scan pattern, according to some embodiments of the present disclosure.
Figure 6B:
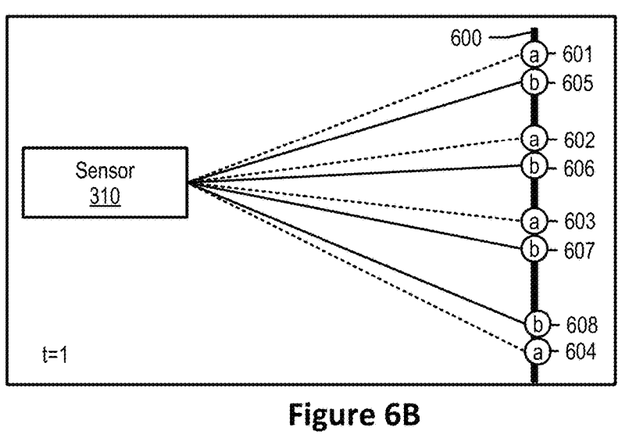
Figure 6C:
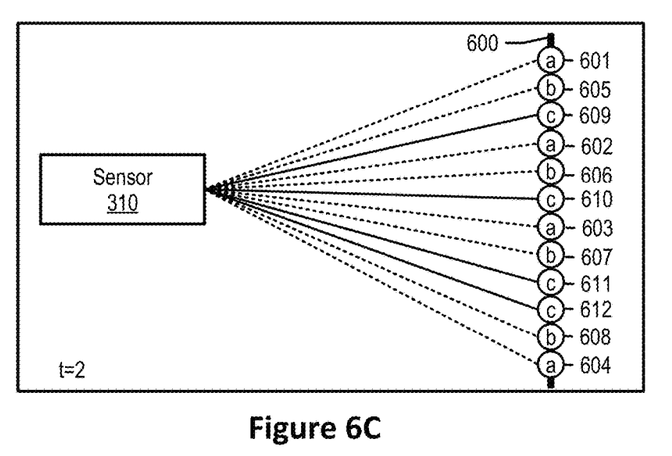

The approach shown in FIGS. 4A-4D increases resolution when PCFA system 300 (e.g., the ADV) is moving. However, when the ADV vehicle is stationary, the scan lines hit the same target locations in every frame and hence accumulating points across frames does not improve resolution. As such, FIGS. 5A-5C and 6A-6C show an approach of dithering the scan pattern from frame to frame to fill the gaps between scan lines that exist in any one frame. FIGS. 5A-5C show an approach that uses uniformly spaced scan lines, and FIGS. 6A-6C show an approach that uses non-uniformly spaced scan lines.

FIGS. 5A-5C are diagrams illustrating an FMCW point cloud frame accumulator (PCFA) system that accumulates static frames by dithering a uniform scan pattern, according to some embodiments of the present disclosure. PCFA system 300 fills in gaps between scan lines by moving the scan pattern up or down from frame to frame while keeping the scan pattern uniform. Thus, as depicted in FIGS. 5A-5C, the dithering pattern is moved slightly from T=0 to T=1, and from T=1 to T=2 to provide for the accumulation of more points across the multiple frames even while the sensor is stationary. In some embodiments, PCFA system 300 is also moving towards object 500 and PCFA system 300 dithers the scan pattern while factoring in the change in the distance to object 500.

FIG. 5A shows PCFA system 300 scanning object 500 at time T=0 using four uniform scan lines and capturing four 'a' points 501, 502, 503, and 504. PCFA system 300 dithers (lowers) the four scan lines in FIG. 5B and shows, at time T=1, PCFA system 300 scans object 500 and captures four 'b' points 505, 506, 507, and 508 that are each below their corresponding 'a' points 501-504. PCFA system 300 further dithers (lowers) the four scan lines in FIG. 5C and shows, at time T=2, PCFA system 300 scans object 500 and captures four 'c' points 509, 510, 511, and 512, which are each below their corresponding 'b' points 505-508. As such, the resolution in FIG. 5C is three times higher than the resolution in FIG. 5A.

FIGS. 6A-6C are diagrams illustrating an FMCW point cloud frame accumulator (PCFA) system accumulating static frames by dithering a non-uniform scan pattern, according to some embodiments of the present disclosure. In some embodiments, PCFA system 300 independently dithers non-uniformly spaced scan lines to fill in gaps and increase overall point cloud resolution. For example, PCFA system 300 may dither some scan lines up and dither some scan lines down relative to their previous scan location (discussed below).

FIG. 6A shows PCFA system 300 scanning object 600 at time T=0 using four non-uniformly spaced scan lines and capturing four 'a' points 601, 602, 603, and 604. The spacing between points 603 and 604 is larger than the spacing between points 601 and 602, and points 602 and 603 due to the non-uniform spacing of the scan lines.

PCFA system 300 dithers the four scan lines in FIG. 6B and shows, at time T=1, PCFA system 300 scans object 600 and captures four 'b' points 605, 606, 607, and 608. FIG. 6B shows that, due to the non-uniform spacing, PCFA system 300 determines that the spacing between 'a' points 603 and 604 is larger than the spacing between 'a' points 602 and 603. As such, PCFA system 300 dithers the scan lines at time T=1 such that 'b' point 608 is above 'a' point 604, while 'b' points 605-607 are below their corresponding 'a' points 601-603.

PCFA system 300 further dithers the four scan lines at time T=2 in FIG. 6C, and shows PCFA system 300 scans object 500 and captures four 'c' points 609, 610, 611, and 612. Again, due to the non-uniform spacing, PCFA system 300 determines that the spacing between 'b' points 607 and 608 is larger than the spacing between 'a' point 603 and 'b' point 606. As such, PCFA system 300 dithers the scan lines at time T=2 such that 'c' point 612 is above 'b' point 608, while 'c' points 609-611 are below their corresponding 'b' points 605-607. In turn, the resolution in FIG. 6C is three times higher than the resolution in FIG. 6A.

Figure 7:
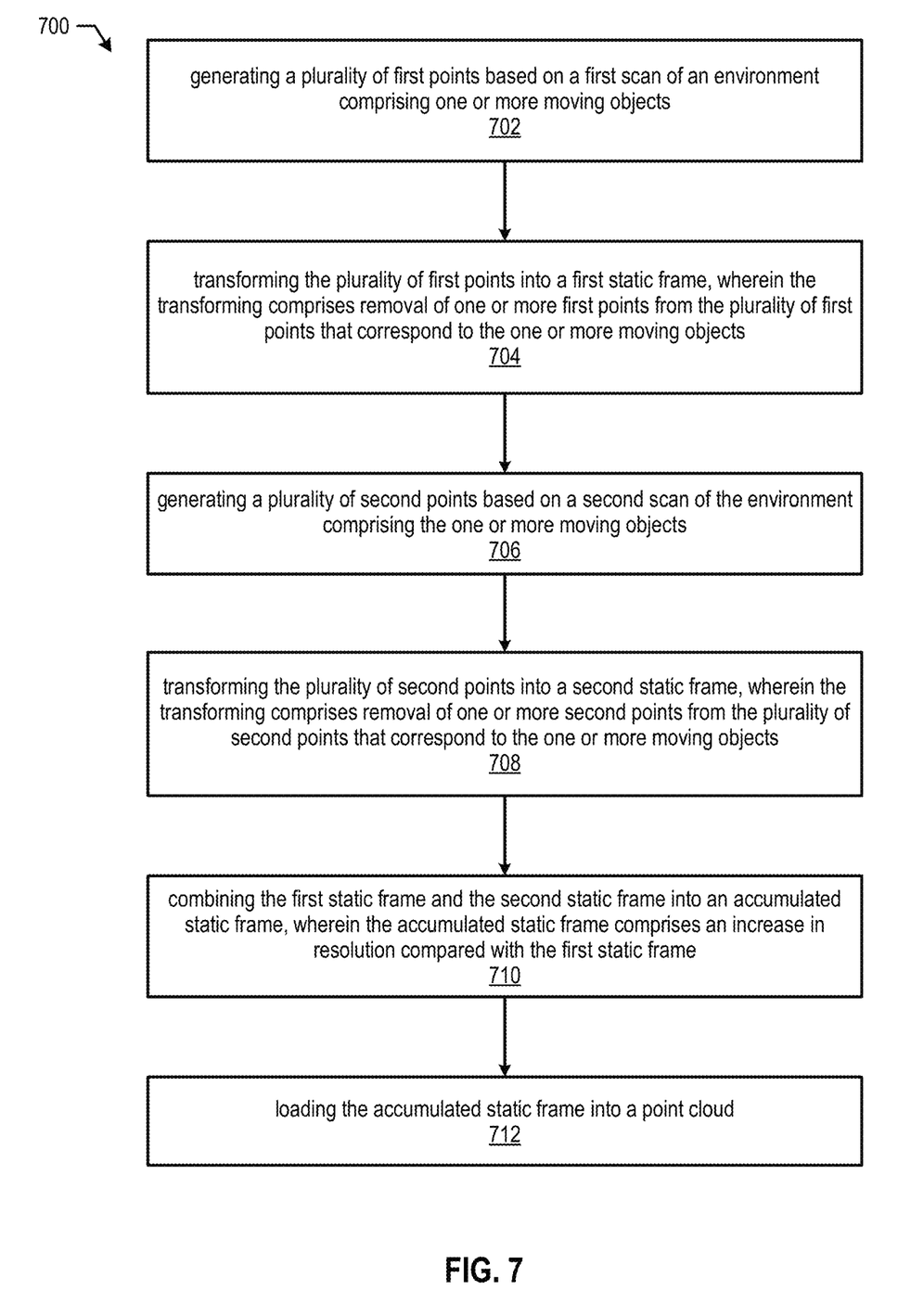
FIG. 7 is a flow diagram depicting an example method of combining static points from multiple scan frames to increase the resolution of a point cloud, according to some embodiments.

FIG. 7 is a flow diagram depicting an example method of combining static points from multiple scan frames to increase the resolution of a point cloud, according to some embodiments. Additional, fewer, or different operations may be performed in the method depending on the particular arrangement. In some embodiments, some or all operations of method 700 may be performed by one or more processors executing on one or more computing devices, systems, or servers (e.g., remote/networked servers or local servers). In some embodiments, method 700 may be performed by a signal processing unit, such as signal processing unit 112 in FIG. 1. Each operation may be re-ordered, added, removed, or repeated. In some embodiments, method 700 may be performed by processing logic including hardware (e.g., circuitry, dedicated logic, programmable logic, a processor, a processing device, a central processing unit (CPU), a system-on-chip (SoC), etc.), software (e.g., instructions running/executing on a processor or processing device), firmware (e.g., microcode), or a combination thereof.

In some embodiments, the method 700 may include operation 702, where the processing logic generates points based on a scan of an environment that includes moving objects. In some embodiments, the method 700 may include operation 704, where the processing logic transforms the points into a static frame, which includes removing some of the points that correspond to the moving objects (e.g., static frame 328 shown in FIG. 3).

In some embodiments, the method 700 may include operation 706, where the processing logic generates other points based on another scan of the environment that includes the moving objects. In some embodiments, the method 700 may include operation 708, where the processing logic transforms the other points into another static frame, which includes removing some of the other points that correspond to the one or more moving object (e.g., static frame 329 shown in FIG. 3).

In some embodiments, the method 700 may include operation 710, where the processing logic combines the static frame and the other static frame into an accumulated static frame, which has an increase in resolution compared with the static frame. In some embodiments, the method 700 may include operation 712, where the processing logic loads the accumulated static frame into a point cloud, such as point cloud 340 shown in FIG. 3.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operations may be performed, at least in part, concurrently with other operations. Instructions or sub-operations of distinct operations may be performed in an intermittent or alternating manner.

The above description of illustrated implementations of the present disclosure, including what is described in the Abstract, is not intended to be exhaustive or to limit the present disclosure to the precise forms disclosed. While specific implementations of, and examples for, the present disclosure are described herein for illustrative purposes, various equivalent modifications are possible within the scope of the present disclosure, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A method of improved frame accumulation for use in a frequency-modulated continuous wave (FMCW) light detection and ranging (LIDAR) system, the method comprising:
    generating a plurality of first points based on a first scan of an environment comprising one or more moving objects;
    transforming the plurality of first points into a first static frame, wherein the transforming comprises removing one or more first points from the plurality of first points that correspond to the one or more moving objects;
    associating, to the first static frame, a first sensor pose that indicates a first position and a first orientation of a sensor at a point in time corresponding to the first scan;
    generating a plurality of second points based on a second scan of the environment comprising the one or more moving objects;
    transforming the plurality of second points into a second static frame, wherein the transforming comprises removing one or more second points from the plurality of second points that correspond to the one or more moving objects;
    associating, to the second static frame, a second sensor pose that indicates a second position and a second orientation of a sensor at a point in time corresponding to the second scan;
    combining, using a processor, the first static frame and the second static frame into an accumulated static frame based on a difference between the first sensor pose and the second sensor pose, wherein the accumulated static frame comprises an increase in resolution compared with the first static frame;
    loading the accumulated static frame into a point cloud; and
    utilizing the point cloud to detect at least one of the one or more moving objects.

2. The method of claim 1, wherein the FMCW LIDAR system comprises a sensor, and wherein the transforming of the plurality of first points further comprises:
    computing a sensor twist of the sensor associated with the first scan, wherein the sensor twist comprises a linear velocity and an angular velocity of the sensor;
    retrieving a Doppler velocity of each one of the first points in the plurality of first points;
    comparing the Doppler velocity of each one of the first points in the plurality of first points with the sensor twist of the sensor to produce a comparison; and
    determining which of the first points from the plurality of first points correspond to the one or more moving objects based on the comparison.

3. The method of claim 2, wherein the first static frame comprises a plurality of first scan lines and the second static frame comprises a plurality of second scan lines that are interlaced between the plurality of first scan lines, wherein the interlacing is based on the sensor twist.

4. The method of claim 1, wherein the FMCW LIDAR system comprises a sensor, and wherein the transforming of the plurality of first points and the plurality of second points further comprises:
    storing the first static frame with the first sensor pose into an accumulator; and
    storing the second static frame with the second sensor pose into the accumulator.

5. The method of claim 1, further comprising:
    generating a plurality of third points based on a third scan of the environment comprising the one or more moving objects, wherein the third scan is subsequent to the first scan and the second scan, and wherein the plurality of third points comprise a plurality of static points and a plurality of dynamic points; and
    loading the plurality of third points into the point cloud with the accumulated static frame.

6. The method of claim 1, further comprising:
    receiving a plurality of first returned optical beams responsive to a transmission of a plurality of first optical beams, wherein the plurality of first optical beams are spaced non-uniformly and are based on a first scan pattern;
    generating the plurality of first points from the plurality of first returned optical beams;
    receiving a plurality of second returned optical beams responsive to a transmission of a plurality of second optical beams, wherein the plurality of second optical beams are spaced non-uniformly and are based on a second scan pattern; and
    generating the plurality of second points from the plurality of second returned optical beams.

7. The method of claim 6, further comprising:
    positioning one or more sensors to a first position to generate the first scan pattern; and
    adjusting the one or more sensors to a second position to generate the second scan pattern.

8. A frequency modulated continuous wave (FMCW) light detection and ranging (LiDAR) system, the system comprising:
    a memory to store a set of instructions; and
    a processor coupled to the memory that, when executing the set of instructions, is configured to:
        generate a plurality of first points based on a first scan of an environment that comprises one or more moving objects;
        remove each point from the plurality of first points that correspond to the one more moving objects to produce a first static frame;
        associate, to the first static frame, a first sensor pose that indicates a first position and a first orientation of a sensor at a point in time corresponding to the first scan;
        generate a plurality of second points based on a second scan of the environment that comprises the one or more moving objects;
        remove each point from the plurality of second points that correspond to the one more moving objects to produce a second static frame;
        associate, to the second static frame, a second sensor pose that indicates a second position and a second orientation of a sensor at a point in time corresponding to the second scan;
        combine the first static frame and the second static frame into an accumulated static frame based on a difference between the first sensor pose and the second sensor pose, wherein the accumulated static frame comprises an increase in resolution compared with the first static frame;
        load the accumulated static frame into a point cloud; and
        utilize the point cloud to detect at least one of the one or more objects.

9. The FMCW LIDAR system of claim 8, wherein the system comprises a sensor, and wherein the instructions, when executed by the processor, cause the system to:

compute a sensor twist of the sensor associated with the first scan, wherein the sensor twist comprises a linear velocity and an angular velocity of the sensor;
retrieve a Doppler velocity of each one of the first points in the plurality of first points;
compare the Doppler velocity of each one of the first points in the plurality of first points with the sensor twist of the sensor to produce a comparison; and
determine which of the first points from the plurality of first points correspond to the one or more moving objects based on the comparison.

10. The FMCW LIDAR system of claim 9, wherein the first static frame comprises a plurality of first scan lines and the second static frame comprises a plurality of second scan lines that are interlaced between the plurality of first scan lines based on the sensor twist.

11. The FMCW LIDAR system of claim 8, wherein the FMCW LIDAR system comprises a sensor, and wherein the instructions, when executed by the processor, cause the system to:
store the first static frame with the first sensor pose into an accumulator; and
store the second static frame with the second sensor pose into the accumulator.

12. The FMCW LIDAR system of claim 8, wherein the instructions, when executed by the processor, cause the system to:
generate a plurality of third points based on a third scan of the environment that comprises the one or more moving objects, wherein the third scan is subsequent to the first scan and the second scan, and wherein the plurality of third points comprise a plurality of static points and a plurality of dynamic points; and
load the plurality of third points into the point cloud with the accumulated static frame.

13. The FMCW LIDAR system of claim 8, further comprising:
an optical source to transmit a plurality of first optical beams and a plurality of second optical beams, wherein the plurality of first optical beams are spaced non-uniformly based on a first scan pattern, and the plurality of second optical beams are spaced non-uniformly based on a second scan pattern;
an optical receiver to receive a plurality of first returned optical beams responsive to the transmission of the plurality of first optical beams, and receive a plurality of second returned optical beams responsive to the transmission of the plurality of second optical beams; and
wherein the instructions, when executed by the processor, cause the system to:
generate the plurality of first points from the plurality of first returned optical beams; and
generate the plurality of second points from the plurality of second returned optical beams.

14. The FMCW LIDAR system of claim 13, wherein the instructions, when executed by the processor, cause the system to:
position one or more sensors to a first position to generate the first scan pattern; and
adjust the one or more sensors to a second position to generate the second scan pattern.

15. A non-transitory computer-readable storage medium including instructions that, when executed by a processor, cause the processor to:
generate a plurality of first points based on a first scan of an environment that comprises one or more moving objects;
transform the plurality of first points into a first static frame, wherein the transformation comprises removal of one or more first points from the plurality of first points that correspond to the one or more moving objects;
associate, to the first static frame, a first sensor pose that indicates a first position and a first orientation of a sensor at a point in time corresponding to the first scan;
generate a plurality of second points based on a second scan of the environment that comprises the one or more moving objects;
transform the plurality of second points into a second static frame, wherein the transformation comprises removal of one or more second points from the plurality of second points that correspond to the one or more moving objects;
associate, to the second static frame, a second sensor pose that indicates a second position and a second orientation of a sensor at a point in time corresponding to the second scan;
combine, by the processor, the first static frame and the second static frame into an accumulated static frame based on a difference between the first sensor pose and the second sensor pose, wherein the accumulated static frame comprises an increase in resolution compared with the first static frame;
load the accumulated static frame into a point cloud; and
utilize the point cloud to detect at least one of the one or more objects.

16. The non-transitory computer-readable storage medium of claim 15, wherein the instructions further cause the processor to:
compute a sensor twist of the sensor associated with the first scan, wherein the sensor twist comprises a linear velocity and an angular velocity of the sensor;
retrieve a Doppler velocity of each one of the first points in the plurality of first points;
compare the Doppler velocity of each one of the first points in the plurality of first points with the sensor twist of the sensor to produce a comparison; and
determine which of the first points from the plurality of first points correspond to the one or more moving objects based on the comparison.

17. The non-transitory computer-readable storage medium of claim 16, wherein the first static frame comprises a plurality of first scan lines and the second static frame comprises a plurality of second scan lines that are interlaced between the plurality of first scan lines based on the sensor twist.

18. The non-transitory computer-readable storage medium of claim 15, wherein the instructions further cause the processor to:
store the first static frame with the first sensor pose into an accumulator; and
store the second static frame with the second sensor pose into the accumulator.

19. The non-transitory computer-readable storage medium of claim 15, wherein the instructions further cause the processor to:
generate a plurality of third points based on a third scan of the environment that comprises the one or more moving objects, wherein the third scan is subsequent to the first scan and the second scan, and wherein the plurality of third points comprise a plurality of static points and a plurality of dynamic points; and load the plurality of third points into the point cloud with the accumulated static frame.

20. The non-transitory computer-readable storage medium of claim 15, wherein the instructions further cause the processor to:

receive a plurality of first returned optical beams responsive to a transmission of a plurality of first optical beams, wherein the plurality of first optical beams are spaced non-uniformly and are based on a first scan pattern;

generate the plurality of first points from the plurality of first returned optical beams;

receive a plurality of second returned optical beams responsive to a transmission of a plurality of second optical beams, wherein the plurality of second optical beams are spaced non-uniformly and are based on a second scan pattern; and generate the plurality of second points from the plurality of second returned optical beams.

\* \* \* \* \*